US012413021B2

(12) United States Patent
Li et al.

(10) Patent No.: US 12,413,021 B2
(45) Date of Patent: Sep. 9, 2025

(54) CONNECTOR, CONNECTOR ASSEMBLY, AND ELECTRONIC DEVICE

(71) Applicant: HUAWEI TECHNOLOGIES CO., LTD., Guangdong (CN)

(72) Inventors: Qiang Li, Dongguan (CN); Congtu Xiao, Dongguan (CN); Zhengyan Ou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 390 days.

(21) Appl. No.: 17/989,733

(22) Filed: Nov. 18, 2022

(65) Prior Publication Data

US 2023/0079030 A1 Mar. 16, 2023

Related U.S. Application Data

(63) Continuation of application No. PCT/CN2021/070176, filed on Jan. 4, 2021.

(30) Foreign Application Priority Data

May 19, 2020 (CN) ......................... 202010424559.2

(51) Int. Cl.
*H01R 13/64* (2006.01)
*H01R 13/514* (2006.01)
*H01R 13/6461* (2011.01)

(52) U.S. Cl.
CPC ....... *H01R 13/6461* (2013.01); *H01R 13/514* (2013.01)

(58) Field of Classification Search
CPC .............. H01R 13/6461; H01R 13/514; H01R 13/6586; H01R 13/6471; H01R 12/716; H01R 13/6585; H01R 13/6582
See application file for complete search history.

(56) References Cited

U.S. PATENT DOCUMENTS 7,553,187 B2 * 6/2009 Feldman .............. H01R 13/506 439/607.17
8,197,282 B1 6/2012 Su et al.
(Continued)

FOREIGN PATENT DOCUMENTS

CN 2519481 Y 10/2002
CN 1446391 A 10/2003
(Continued)

OTHER PUBLICATIONS

1 Office Action Notice of Reasons for Rejection for Application No. 2022-570354 dated Dec. 26, 2023, 7 pages.
(Continued)

*Primary Examiner* — Truc T Nguyen

(57) ABSTRACT

A connector, a connector assembly, and an electronic device are provided to improve crosstalk phenomenon between signals and optimize signal transmission performance. The connector includes a plurality of first terminal modules arranged in an array manner, where the first terminal module includes a shielding unit and a first signal terminal, and the shielding unit includes a plurality of shielding boards that are sequentially connected to form a shielding cavity. A first surface of the shielding board back to the shielding cavity is used to cooperate with a peer shielding board of a paired connector, and a contact unit protruding from the first surface is further disposed on the shielding board. The contact unit is configured to electrically connect to the peer shielding board of the paired connector, and the first signal terminal is located in the shielding cavity.

16 Claims, 8 Drawing Sheets

(56) References Cited

U.S. PATENT DOCUMENTS

| | | | | |
|---|---|---|---|---|
| 9,293,874 | B2 * | 3/2016 | Morley | H01R 24/40 |
| 10,574,000 | B1 * | 2/2020 | McClinton | H01R 13/6471 |
| 2011/0034075 | A1 | 2/2011 | Feldman et al. | |
| 2011/0034081 | A1 * | 2/2011 | Feldman | H01R 13/6583 439/607.35 |
| 2013/0048369 | A1 * | 2/2013 | Malek | H05K 9/0032 29/592.1 |
| 2015/0364879 | A1 | 12/2015 | Morley et al. | |
| 2019/0237911 | A1 * | 8/2019 | Munoz | H01R 13/6587 |
| 2020/0144772 | A1 * | 5/2020 | Trout | H01R 13/658 |
| 2021/0100140 | A1 * | 4/2021 | He | H05K 9/0088 |
| 2021/0203107 | A1 * | 7/2021 | Liu | H01R 13/6471 |
| 2021/0351548 | A1 * | 11/2021 | Huang | H01R 13/506 |
| 2022/0393406 | A1 * | 12/2022 | Xu | H01R 24/64 |
| 2023/0028835 | A1 * | 1/2023 | Westman | H01R 12/721 |

FOREIGN PATENT DOCUMENTS

| | | | |
|---|---|---|---|
| CN | 1739223 | A | 2/2006 |
| CN | 203277844 | U | 11/2013 |
| CN | 203503910 | U | 3/2014 |
| CN | 104466545 | A | 3/2015 |
| CN | 104916953 | A | 9/2015 |
| CN | 105281070 | A | 1/2016 |
| CN | 107534253 | A | 1/2018 |
| CN | 207052873 | U | 2/2018 |
| CN | 108011254 | A | 5/2018 |
| CN | 108352633 | A | 7/2018 |
| CN | 209056708 | U | 7/2019 |
| CN | 110416829 | A | 11/2019 |
| CN | 110783776 | A | 2/2020 |
| CN | 210489984 | U | 5/2020 |
| CN | 210517118 | U | 5/2020 |
| CN | 113690687 | B | 6/2023 |
| JP | H0559865 | U | 8/1993 |
| JP | H0773931 | A | 3/1995 |
| JP | H0730459 | U | 6/1995 |
| JP | 2004259542 | A | 9/2004 |
| JP | 2008226736 | A | 9/2008 |
| JP | 2010161012 | A | 7/2010 |
| WO | 9926321 | A1 | 5/1999 |

OTHER PUBLICATIONS

European Search Report for Application No. 21808632 dated Sep. 22, 2023, 9 pages.

Notice of Reasons for Rejection for Application No. 2022-570354 dated Apr. 18, 2024, 7 pages.

Chinese Office Action for Application No. 202010424559.2 dated Nov. 2, 2022, 8 pages.

Chinese Office Action for Application No. 202010424559.2 dated Mar. 15, 2022, 8 pages.

Chinese Office Action for Application No. 202010424559.2 dated Aug. 29, 2022, 8 pages.

* cited by examiner

CONNECTOR, CONNECTOR ASSEMBLY, AND ELECTRONIC DEVICE

CROSS-REFERENCE TO RELATED APPLICATIONS

This application is a continuation of International Application No. PCT/CN2021/070176, filed on Jan. 4, 2021, which claims priority to Chinese Patent Application No. 202010424559.2, filed on May 19, 2020. The disclosures of the aforementioned applications are hereby incorporated by reference in their entireties.

TECHNICAL FIELD

This application relates to the field of electronic device technologies, and in particular, to a connector, a connector assembly, and an electronic device.

BACKGROUND

A high-speed connector is widely applied to information and communications technologies, and is a type of connector that is commonly used in a large communications device, a super-high performance server, a giant computer, an industrial computer, and a high-end storage device. A main function of the high-speed connector is to connect a line card and a network interface card, and transmit a high-speed differential signal, a single-ended signal, or the like between the line card and the network interface card. With continuous improvement of communications technologies, requirements for a data transmission rate and transmission quality are also increasingly high. Currently, for an existing high-speed connector, due to structure limitation of a grounding shielding board, there is severe crosstalk between signals, which affects a data transmission rate and data transmission quality.

SUMMARY

This application provides a connector, a connector assembly, and an electronic device, to improve a crosstalk phenomenon between signals and optimize signal transmission performance.

According to a first aspect, this application provides a connector. The connector includes a plurality of first terminal modules arranged in an array manner. The first terminal module may include a shielding unit and a first signal terminal. The shielding unit may include a plurality of shielding boards. The plurality of shielding boards may be sequentially connected to form a shielding cavity. The first signal terminal is located in the shielding cavity. In a specific setting, the shielding board has a first surface back to the shielding cavity. When the connector and a paired connector are mutually paired, the first surface may be used to cooperate with a peer shielding board to implement an electrical connection. To improve reliability of the electrical connection between the shielding board and the peer shielding board, a contact unit protruding from the first surface may be disposed on the shielding board. The shielding board may specifically implement the electrical connection to the peer shielding board by using the contact unit.

In the foregoing solution, the plurality of shielding boards are disposed around the first signal terminal, and each shielding board may be electrically connected to a peer shielding board of the paired connector by using a contact unit. Therefore, there are relatively sufficient signal return paths. A shielding structure surrounding the first signal terminal may be formed, to implement a relatively good shielding effect and optimize crosstalk performance of the connector.

In a specific setting, the foregoing contact unit may be a rigid contact unit, or may be an elastic contact unit, provided that the shielding board and the peer shielding board can be reliably electrically connected. This is not limited in this application.

When the contact unit is a rigid contact unit, the contact unit may be specifically a protrusion structure protruding from the first surface. Because the protrusion structure has a relatively low height, a return path formed between the shielding board and the peer shielding board is very short, to implement a good shielding effect.

A specific structure form of the protrusion structure is not limited. For example, the protrusion structure may be an arc protrusion, a column protrusion, or the like. In addition, to increase a contact area between the protrusion structure and the peer shielding board, a top part of the protrusion structure in contact with the peer shielding board may be designed as a plane shape.

When the contact unit is an elastic contact unit, in a specific implementation, the elastic contact unit may be a first spring arm that is disposed and inclined to a direction away from the first surface. When the elastic contact unit and the paired connector are mutually paired, one end that is of the first spring arm and that is away from the first surface may be electrically connected to the peer shielding board. The first spring arm forms a signal return path between the shielding board and the peer shielding board.

In a specific setting, a length of the first spring arm may be designed relatively small, for example, may be between 0.9 mm and 2.5 mm, to shorten a length of the return path.

In addition, to maintain relatively good elasticity performance of the first spring arm, a width dimension of the first spring arm may be designed relatively small, and may be specifically a value between 0.25 mm and 0.3 mm.

In another implementation, the elastic contact unit may alternatively be a double-spring arm structure. Specifically, the elastic contact unit may include two second spring arms. The two second spring arms are respectively disposed and inclined to the direction away from the first surface. First ends of the two spring arms are separately connected to the shielding board. Second ends of the two spring arms extend away from the first surface. The two spring arms intersect with each other. During mutual pairing with the paired connector, an intersection position of the two second spring arms may be electrically connected to the peer shielding board. In this way, the two second spring arms may separately form signal return paths between the shielding board and the peer shielding board. Therefore, by using this structure, one contact unit may form two signal return paths, which helps increase a quantity of signal return paths between the entire shielding unit and the paired connector, thereby optimizing signal crosstalk performance.

In some possible implementations, a quantity of shielding boards in the shielding unit may be three, four, five, or more, provided that various shielding boards can form the shielding cavity accommodating the first signal terminal. This is not limited in this application.

When the shielding unit includes four shielding boards, each two of the four shielding boards may be disposed opposite to each other. In the two shielding boards disposed opposite to each other, a contact unit disposed on at least one shielding board is an elastic contact unit. In this way, when the connector and the paired connector are mutually paired, the peer shielding board may be interposed between two shielding boards of two adjacent first terminal modules. Because of an array arrangement feature of the first terminal modules, an elastic contact unit is disposed on at least one of the two shielding boards. An elastic force applied to one side of the peer shielding board by using the elastic contact unit may cause the peer shielding board to abut against the contact unit on the other side. In this way, a reliable electrical connection can be implemented for both the peer shielding board and the shielding boards on two sides.

In the foregoing solution, the four shielding boards may be respectively a first shielding board, a second shielding board, a third shielding board, and a fourth shielding board. The first shielding board and the third shielding board are disposed opposite to each other and arranged in a column direction, and the second shielding board and the fourth shielding board are disposed opposite to each other and arranged in a row direction. To simplify a structure and a manufacturing process of the connector, first shielding boards that are of the plurality of first terminal modules and that are disposed in the same row may be connected to each other as an integral structure. Similarly, third shielding boards that are of the plurality of first terminal modules and that are disposed in the same row may also be connected to each other as an integral structure.

To increase a signal return path, at least one contact unit may be disposed on each shielding board.

In addition, in an interposing direction of the shielding board and the peer shielding board, a vertical length of a contact unit disposed on each shielding board in this direction may be set to be within 1 mm, to ensure that conversion points of a signal current and a grounding return current are basically on the same plane, thereby reducing conversion in which a signal returns to a reference ground, pushing back occurrence of a frequency of a crosstalk resonance point, and improving crosstalk performance after the connectors are mutually paired.

According to a second aspect, this application further provides a connector assembly, including the connector in any possible implementation of the first aspect and a paired connector that is paired with and connected to the connector in an interposing manner. The paired connector may include a plurality of second terminal modules arranged in an array manner. The second terminal module includes a second signal terminal and a plurality of peer shielding boards. The plurality of peer shielding boards are disposed around the second signal terminal. A quantity of peer shielding boards in the second terminal module is equal to a quantity of shielding boards in a first terminal module, to ensure adaptation between the paired connector and the connector and a shielding effect after the mutual pairing. When the paired connector and the connector are mutually paired, the second signal terminal is specifically configured to electrically connect to a first signal terminal. The peer shielding board may be interposed between two adjacent first terminal modules. Two sides of the peer shielding board may be respectively electrically connected to two shielding boards of two adjacent first terminal modules.

For the connector assembly provided in the foregoing solution, a shielding structure surrounding a signal terminal can be formed through cooperation between the shielding board and the peer shielding board, to obtain relatively sufficient signal return paths and implement a relatively good shielding effect.

In some possible implementations, a quantity of peer shielding boards in the second terminal module may be specifically four. The four peer shielding boards are respectively a fifth shielding board, a sixth shielding board, a seventh shielding board, and an eighth shielding board. The fifth shielding board and the seventh shielding board are disposed opposite to each other and arranged in a column direction, and the sixth shielding board and the eighth shielding board are disposed opposite to each other and arranged in a row direction. Similarly, to simplify a structure of the connector, fifth shielding boards that are of the plurality of second terminal modules and that are disposed in the same row may be connected to each other to form a one-piece shielding board, and seventh shielding boards that are of the plurality of second terminal modules and that are disposed in the same row may also be connected to each other to form a one-piece shielding board.

Because a long shielding board cannot be fully straight in an actual processing process, a fine deflection may occur. To ensure smooth interposing between the one-piece shielding board and a long shielding board formed by a first shielding board or a third shielding board of the connector, in a setting, an interposing direction of the paired connector and the connector is used as a first direction. An arc notch and two flat parts located on two ends of the arc notch are disposed on a first side surface of the one-piece shielding board in the first direction. When an interposing connection is implemented for the one-piece shielding board and the long shielding board of the connector, a structure of the arc notch may cause an acting force in an opposite direction of the deflection on the long shielding board of the connector, to reduce the deflection, thereby reducing a risk of a bent pin or a crush pin of the long shielding board and improving structural reliability of the connector assembly.

According to a third aspect, this application further provides an electronic device. The electronic device includes a first circuit board, a second circuit board, and the connector assembly in any one of the foregoing possible implementations of the second aspect. A connector may be disposed on the first circuit board, and is electrically connected to the first circuit board. A paired connector may be disposed on the second circuit board, and is electrically connected to the second circuit board. In this way, when the connector and the paired connector are mutually paired and connected, a signal may be transmitted between the first circuit board and the second circuit board. Because of relatively good shielding performance of the connector assembly, a crosstalk phenomenon between signals can be improved, and signal transmission performance can be optimized.

Specific types of the first circuit board and the second circuit board are not limited. For example, in some possible implementations, the first circuit board may be specifically a line card, and the second circuit board may be specifically a network interface card.

REFERENCE NUMERALS

Figure 1:
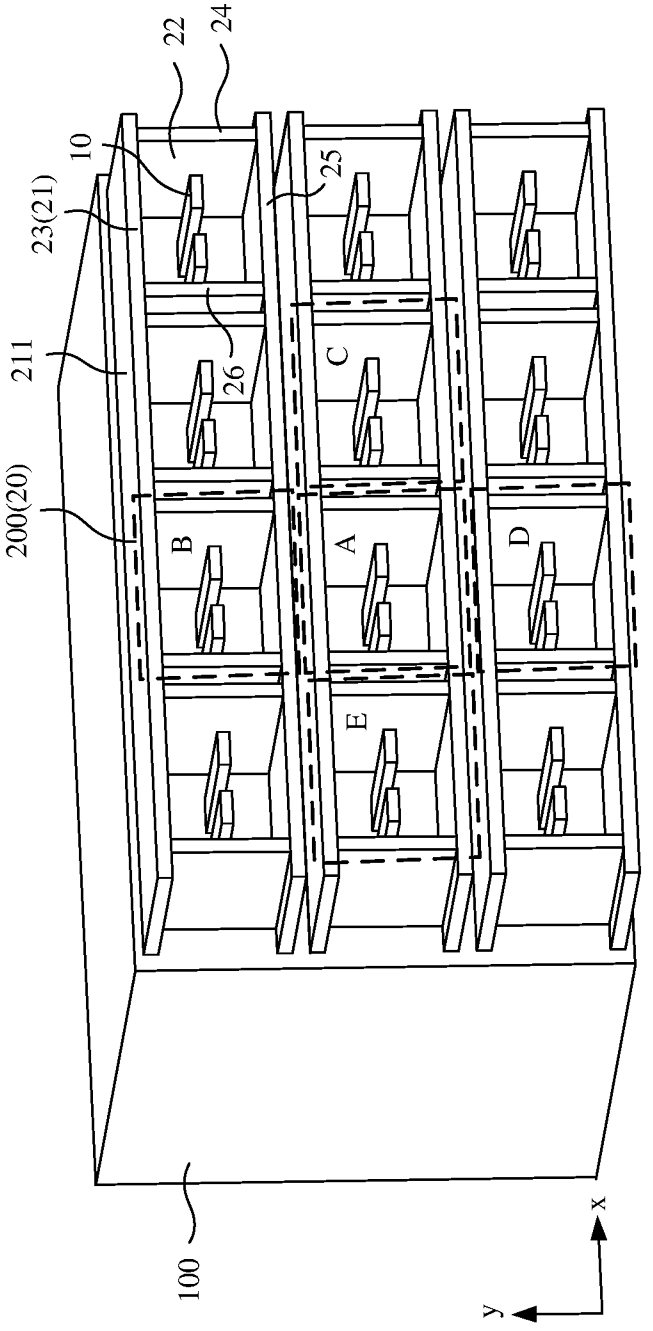
FIG. 1 is a schematic diagram of a structure of a connector according to this application.

100: Base 200: First terminal module 10: First signal terminal 20: Shielding unit 21: Shielding board

22: Shielding cavity 23: First shielding board 24: Second shielding board 25: Third shielding board 26: Fourth shielding board

211: First surface 51: Peer shielding board 30: Contact unit 31: Protrusion structure 32: First spring arm 27: Notch

33: Second spring arm 300: Second terminal module 40: Second signal terminal 52: Fifth shielding board 53: Sixth shielding board

54: Seventh shielding board 55: Eighth shielding board 56: One-piece shielding board 28: Long female shielding board 57: Arc notch

58: Flat part

DESCRIPTION OF EMBODIMENTS

To make objectives, technical solutions, and advantages of this application clearer, the following further describes this application in detail with reference to the accompanying drawings.

For ease of understanding a connector provided in embodiments of this application, the following first describes an application scenario of the connector. The connector may be applied to an electronic device, and is configured to transmit a high-speed differential signal, a single-end signal, or the like. The electronic device may be a device such as a communications device, a server, a supercomputer, a router, or a switch in the conventional technologies. When a male connector and a female connector are mutually paired, to ensure signal transmission quality, a grounding shielding structure is generally disposed between signals. With a gradual increase of the signal path rate and density, for a conventional shielding structure, a phenomenon such as crosstalk resonance between signals occurs due to factors such as a relatively small quantity of grounding points and an excessively long return path. Especially, in a data transmission scenario at 56 Gbps or a higher rate, encapsulation crosstalk of the connector has become a crosstalk bottleneck of the entire device. A design of the shielding structure has important impact on whether signal transmission quality can be improved.

On this basis, an embodiment of this application provides a connector. In the connector, shielding boards are disposed around a signal terminal. When the connector and a paired connector are mutually paired, each shielding board may be separately electrically connected to a peer shielding board of the paired connector. Therefore, there are relatively sufficient signal return paths. A shielding structure surrounding the signal terminal may be formed, to implement a good shielding effect and optimize crosstalk performance of the connector. The following describes in detail a connector provided in embodiments of this application with reference to the accompanying drawings.

FIG. 1 is a schematic diagram of a structure of a connector according to an embodiment of this application. The connector provided in this embodiment of this application may include a base 100 and a plurality of first terminal modules 200. The first terminal modules 200 may be disposed on the base 100, and are arranged on the base 100 in an array. In an implementation, the first terminal module 200 may include a first signal terminal 10 and a shielding unit 20. The first signal terminals 10 may be differential signal terminals disposed in pairs. When the connector and the paired connector are mutually paired and connected, the first signal terminal 10 may be configured to electrically connect to a second signal terminal of the paired connector, to transmit a differential signal in an electronic device. The shielding unit 20 may include a plurality of shielding boards 21. In a setting, the plurality of shielding boards 21 may be sequentially connected to form a shielding cavity 22, to accommodate the first signal terminal 10. In this way, the shielding boards 21 are separately grounded, to generate a plurality of signal return paths and form the shielding structure surrounding the first signal terminal 10, thereby implementing relatively even grounding distribution and implementing a relatively good signal shielding effect.

In an array of the first terminal modules 200, each first terminal module 200 may be disposed adjacent to N other first terminal modules 200. It may be understood that N is a quantity of shielding boards 21 in the shielding unit 20. In an implementation, N may be three, four, five, or more, provided that various shielding boards 21 can form the shielding cavity 22 accommodating the first signal terminal 10. This is not limited in this application. The following uses four shielding boards 21 as an example for purposes of description.

For ease of description, the four shielding boards 21 are respectively referred to as a first shielding board 23, a second shielding board 24, a third shielding board 25, and a fourth shielding board 26. The first shielding board 23, the second shielding board 24, the third shielding board 25, and the fourth shielding board 26 are sequentially connected. The first shielding board 23 and the third shielding board 25 are disposed opposite to each other, and the second shielding board 24 and the fourth shielding board 26 are disposed opposite to each other. In the array of the first terminal modules, the first shielding board 23 and the third shielding board 25 may be arranged in a row direction (that is, an x direction) of the array, and the second shielding board 24 and the fourth shielding board 26 may be arranged in a column direction (that is, a y direction) of the array. To simplify a structure and a manufacturing process of the connector, in this embodiment of this application, the first shielding boards 23 that are of the plurality of first terminal modules 200 and that are disposed in the same row may be connected to each other as an integral structure. Similarly, the third shielding boards 25 that are of the plurality of first terminal modules 200 and that are disposed in the same row may be connected to each other as an integral structure.

In this embodiment of this application, each shielding board 21 may be specifically grounded when being electrically connected to the peer shielding board of the paired connector. In an implementation, the shielding board 21 has a first surface 211 back to the shielding cavity 22. The first surface 211 is a surface of the shielding board 21 in cooperation with the peer shielding board. A first terminal module A in FIG. 1 is used as an example. A position of a first shielding board 23 of the first terminal module A is relative to a position of a third shielding board 25 of a first terminal module B on an upper side. When the connector and the paired connector are mutually paired, a peer shielding board may be specifically interposed between the first shielding board 23 of the first terminal module A and the third shielding board 25 of the first terminal module B. In other words, the first shielding board 23 of the first terminal module A and the third shielding board 25 of the first terminal module B may be electrically connected to the same peer shielding board, to simplify a structure of the paired connector and reduce a size of a connector assembly formed after mutual pairing.

Similarly, a second shielding board 24 of the first terminal module A and a fourth shielding board 26 of a first terminal module C on a right side may be electrically connected to the same peer shielding board. A third shielding board 25 of the first terminal module A and a first shielding board 23 of a first terminal module D on a lower side may be electrically connected to the same peer shielding board. A fourth shielding board 26 of the first terminal module A and a second shielding board 24 of a first terminal module E on a left side may be electrically connected to the same peer shielding board.

To improve reliability of the electrical connection between the shielding board 21 and the peer shielding board, a contact unit protruding from the first surface 211 may be further disposed on the shielding board 21. The electrical connection between the shielding board 21 and the peer shielding board is specifically implemented by using the contact unit. In specific implementation, the contact unit may be a rigid contact unit, or may be an elastic contact unit. This is not specifically limited in this embodiment of this application.

Figure 2:
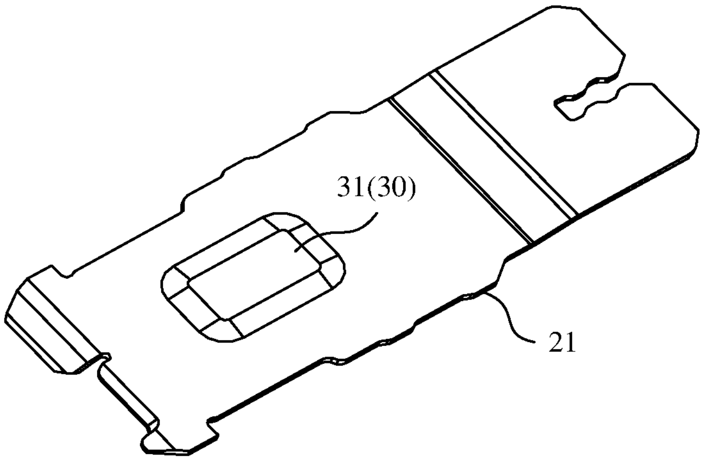
FIG. 2 is a schematic diagram of a structure of a shielding board according to an embodiment of this application.
Figure 3:
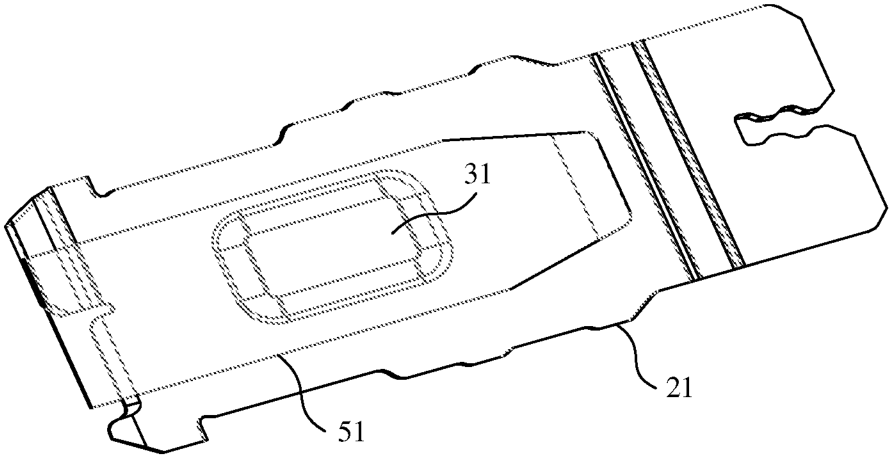
FIG. 3 is a schematic diagram of a structure of an electrical connection between a shielding board and a peer shielding board in FIG. 2.

FIG. 2 is a schematic diagram of a structure of a shielding board 21 according to an embodiment of this application. FIG. 3 is a schematic diagram of a structure of an electrical connection between a shielding board 21 and a peer shielding board 51 in FIG. 2. In this embodiment, when the contact unit 30 is a rigid contact unit, the contact unit 30 may be specifically a protrusion structure 31. During mutual pairing with the paired connector, a top part of the protrusion structure 31 may be in rigid contact with the peer shielding board 51 to implement an electrical connection. Because a height of the protrusion structure 31 is relatively low, a return path formed between the shielding board 21 and the peer shielding board 51 is very short, to implement a relatively good shielding effect and to push back on the occurrence of frequency of crosstalk resonance.

In the foregoing embodiment, a structure form of the protrusion structure 31 is not limited. For example, the protrusion structure 31 may be an arc protrusion or a column protrusion. To ensure reliable contact between the contact unit 30 and the peer shielding board 51, in this embodiment of this application, the top part of the protrusion structure 31 may be designed as a plane shape, to increase a contact area between the protrusion structure 31 and the peer shielding board 51.

Figure 4:
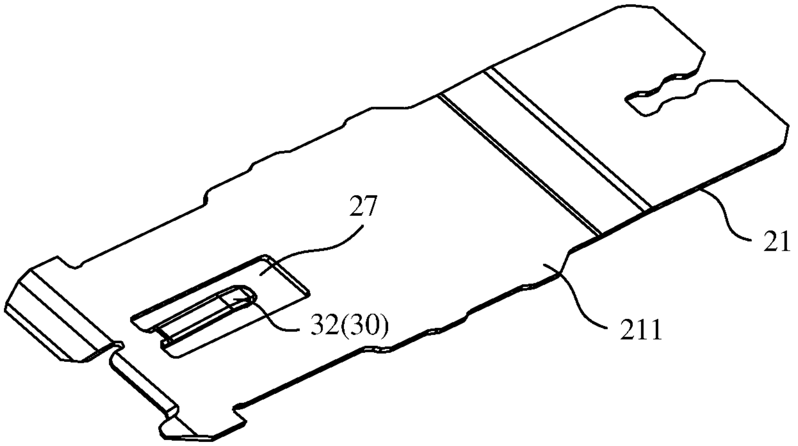
FIG. 4 is a schematic diagram of a structure of another shielding board according to an embodiment of this application.
Figure 5:
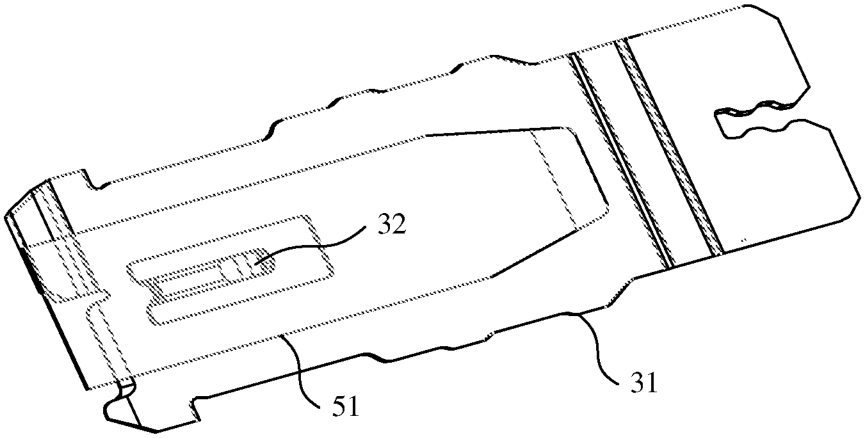
FIG. 5 is a schematic diagram of a structure of an electrical connection between a shielding board and a peer shielding board in FIG. 4.

FIG. 4 is a schematic diagram of a structure of another shielding board 21 according to an embodiment of this application. FIG. 5 is a schematic diagram of a structure of an electrical connection between a shielding board 21 and a peer shielding board 51 in FIG. 4. In this embodiment, when the contact unit 30 is an elastic contact unit, the contact unit 30 may be specifically a spring arm structure, that is, a first spring arm 32 shown in FIG. 4. In a setting, the first spring arm 32 may be disposed and inclined to a direction away from the first surface 211. A first end of the first spring arm 32 is connected to the shielding board 21, and a second end extends in the direction away from the first surface 211. During mutual pairing with the paired connector, the second end of the first spring arm 32 may be in elastic contact with the peer shielding board 51 to implement an electrical connection. In this case, the first spring arm 32 forms a signal return path between the shielding board 21 and the peer shielding board 51.

In the foregoing embodiment, a length range of the first spring arm 32 may be between 0.9 mm and 2.5 mm. For example, a length of the first spring arm 32 may be specifically 0.9 mm, 1.1 mm, 1.3 mm, 1.5 mm, 1.7 mm, 1.9 mm, 2.1 mm, 2.3 mm, or 2.5 mm. In comparison with a spring arm with a length greater than 3 mm in the conventional technologies, the length of the return path can be obviously shortened in this solution. In addition, to maintain relatively good elasticity performance of the first spring arm 32, a width dimension of the first spring arm 32 may be designed to be relatively small. In this embodiment of this application, a width range of the first spring arm 32 may be between 0.25 mm and 0.3 mm. For example, a width of the first spring arm 32 may be specifically 0.25 mm, 0.26 mm, 0.27 mm, 0.28 mm, 0.29 mm, or 0.3 mm. Because both the length dimension and the width dimension of the first spring arm 32 are relatively small, inductivity of the formed return path is reduced. Therefore, high-frequency signal resonance above 30 GHz can be effectively reduced.

In addition, in some embodiments of this application, a notch 27 may be further disposed on the shielding board 21. The first spring arm 32 may be specifically disposed in the notch 27, to reduce an overall thickness of the shielding board 21. In an implementation, the first end of the first spring arm 32 may be connected to an inner wall of the notch 27, to improve structural stability of the first spring arm 32.

Figure 6:
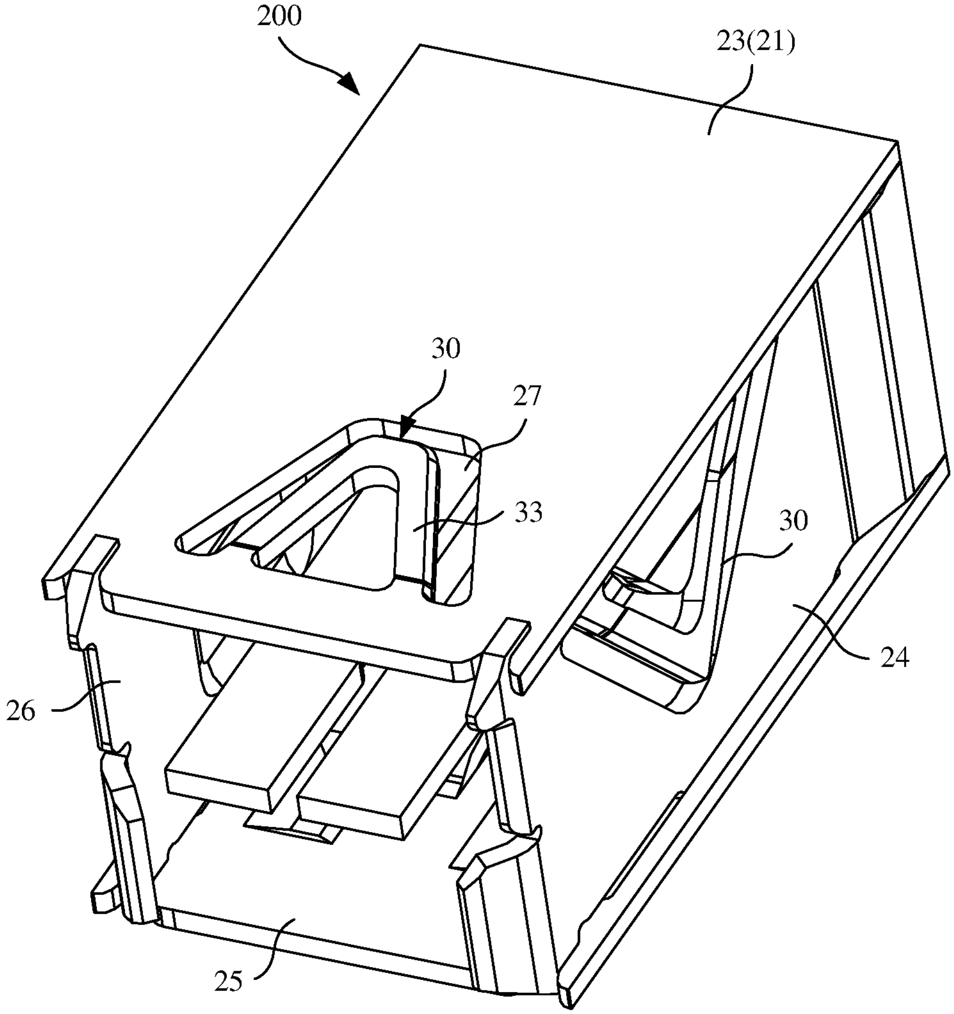
FIG. 6 is a schematic diagram of a structure of a first terminal module according to an embodiment of this application.

FIG. 6 is a schematic diagram of a structure of a first terminal module 200 according to an embodiment of this application. In addition to the foregoing single spring arm form, in this embodiment of this application, when the contact unit 30 is an elastic contact unit, the contact unit 30 may be further designed as a double-spring arm structure, to form more signal return paths between the connector and the paired connector. Specifically, the contact unit 30 includes two second spring arms 33. The two second spring arms 33 are respectively disposed and inclined to directions away from the first surface 211. First ends of the two second spring arms 33 are separately connected to the shielding board 21. Second ends of the two spring arms 33 extend in the directions away from the first surface 211. The two spring arms 33 intersect with each other. In other words, the contact unit 30 is a V-shaped structure. During mutual matching with the paired connector, an intersection position of the two second spring arms 33 may be in contact with the peer shielding board 51 to implement an electrical connection. In this way, the two second spring arms 33 are separately formed as signal return paths between the shielding board 21 and the peer shielding board 51. In other words, the contact unit 30 is designed as a double-spring arm structure. One contact unit 30 may form two signal return paths, which helps to increase a quantity of signal return paths between the entire shielding unit and the paired connector, to optimize signal crosstalk performance.

Similarly, in some embodiments of this application, the elastic contact unit may alternatively be specifically disposed in the notch 27 of the shielding board, to reduce an overall thickness of the shielding board 21. In specific implementation, first ends of the two second spring arms 33 may be separately connected to the inner wall of the notch 27, to improve structural stability of the contact unit 30.

Figure 7:
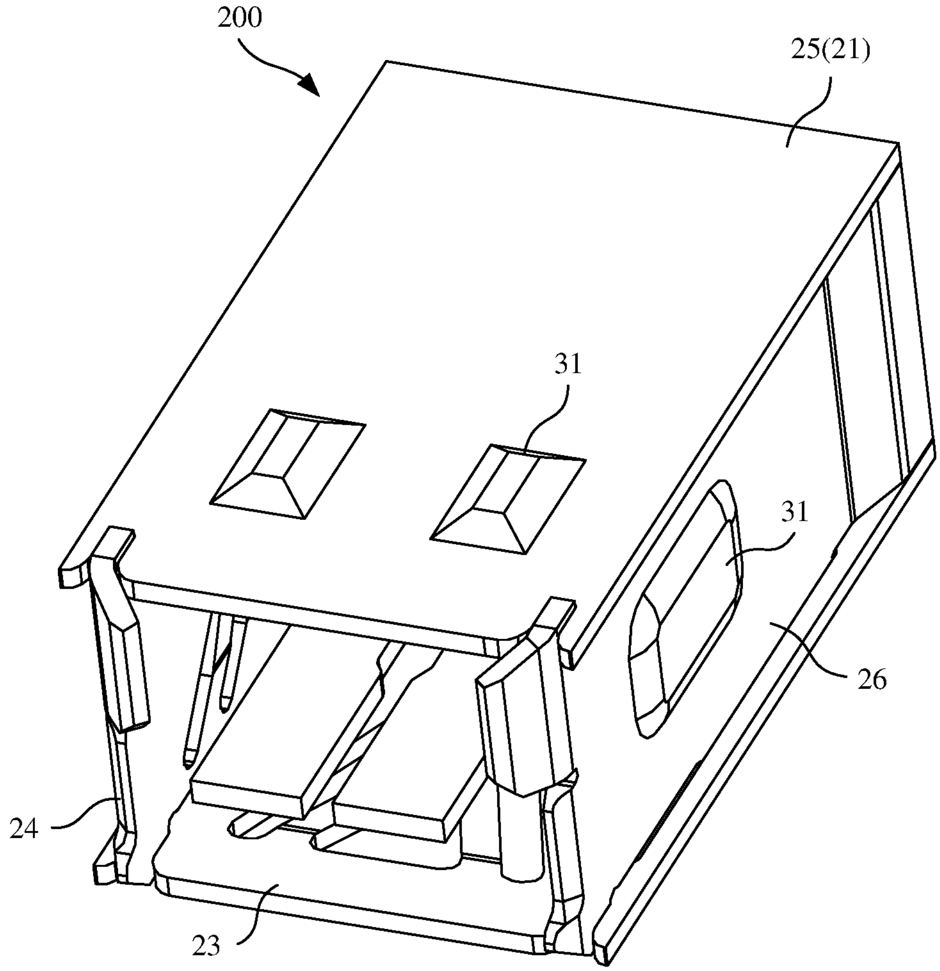
FIG. 7 is a schematic diagram of a structure of a first terminal module after being rotated by a specific angle shown in FIG. 6.
Figure 8:
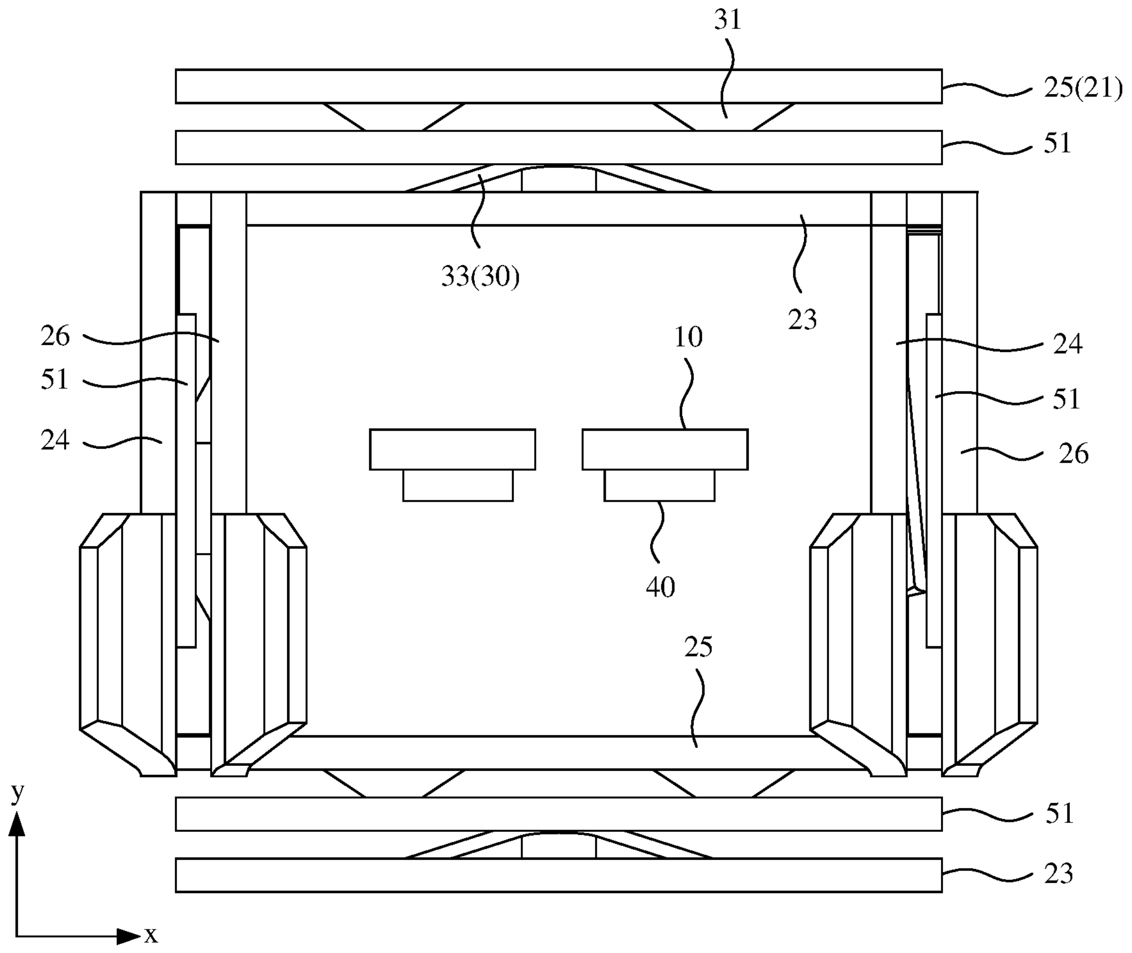
FIG. 8 is a schematic diagram of a structure of mutual pairing between a first terminal module and a paired connector shown in FIG. 6.

FIG. 7 is a schematic diagram of a structure of a first terminal module 200 after being rotated by a specific angle shown in FIG. 6. FIG. 8 is a schematic diagram of a structure of mutual pairing between a first terminal module 200 and a paired connector shown in FIG. 6. With reference to FIG. 6, FIG. 7, and FIG. 8, it may be learned from the foregoing description that for a particular first terminal module 200, the first shielding board 23 of the particular first terminal module 200 and the third shielding board 25 of the first terminal module 200 on the upper side may be electrically connected to the same peer shielding board 51. The third shielding board 25 of the particular first terminal module 200 and the first shielding board 23 of the first terminal module 200 on a lower side may be electrically connected to the same peer shielding board 51. Therefore, for the peer shielding board 51 disposed in a row direction (that is, an x direction), the peer shielding board 51 is always interposed between the first shielding board 23 and the third shielding board 25 of the two adjacent first terminal modules 200. To ensure reliability of an electrical connection between the peer shielding board 51 and each of the corresponding first shielding board 23 and the third shielding board 25, in this embodiment of this application, the contact unit 30 disposed on at least one shielding board of the first shielding board 23 and the third shielding board 25 is an elastic contact unit. For example, the contact unit 30 disposed on the first shielding board 23 is an elastic contact unit, and the contact unit 30 disposed on the third shielding board 25 is a rigid contact unit. In this way, when the connector and the paired connector are mutually paired, the peer shielding board 51 can be smoothly interposed between the first shielding board 23 and the third shielding board 25. In addition, an elastic force applied to one side of the peer shielding board 51 by using the elastic contact unit may cause the peer shielding board 51 to abut against the rigid contact unit on the other side. In this way, a reliable electrical connection can be implemented between the peer shielding board 51 and the third shielding board 25.

For the second shielding board 24 and the fourth shielding board 26, the second shielding board 24 of the particular first terminal module 200 and the fourth shielding board 26 of the first terminal module 200 on a right side may be electrically connected to the same peer shielding board 51, and the fourth shielding board 26 of the particular first terminal module 200 and the second shielding board 24 of the first terminal module 200 on a left side may be electrically connected to the same peer shielding board 51. Therefore, for the peer shielding board 51 disposed in the column direction, the peer shielding board 51 is always interposed between the second shielding board 24 and the fourth shielding board 26 of two adjacent first terminal modules 200. Similarly, to ensure reliability of an electrical connection between the peer shielding board 51 and each of the corresponding second shielding board 24 and the fourth shielding board 26, in this embodiment of this application, the contact unit disposed on at least one shielding board of the second shielding board 24 and the fourth shielding board 26 is an elastic contact unit. For example, the contact unit 30 disposed on the second shielding board 24 is an elastic contact unit, and the contact unit 30 disposed on the fourth shielding board 26 is a rigid contact unit. A specific connection effect is similar to the foregoing solution. Details are not described herein again.

It should be noted that, in an interposing direction of the connector and the paired connector, a vertical length of the contact unit 30 disposed on each of the first shielding board 23, the second shielding board 24, the third shielding board 25, and the fourth shielding board 26 in this direction may be set to be within 1 mm. In this design, it is ensured that conversion points of a signal current and a grounding return current are basically on the same plane, thereby reducing conversion in which a signal returns to a reference ground, pushing back occurrence of a frequency of a crosstalk resonance point, and improving crosstalk performance after the connectors are mutually paired.

In addition, one or more contact units 30 may be disposed on each shielding board 21. A specific quantity of disposed contact units 30 may be determined based on a size of the shielding board 21, to increase a signal return path between the connector and the paired connector as much as possible without affecting normal performance of the connector, thereby improving a signal crosstalk phenomenon after the connectors are mutually paired. For example, in the embodiment shown in FIG. 8, two protrusion structures 31 are disposed on the third shielding board 25. Therefore, two signal return paths may be formed between the third shielding board 25 and the peer shielding board 51, two signal return paths are provided by the V-shaped elastic contact unit 30 disposed on the first shielding board 23, two signal return paths are provided by the V-shaped elastic contact unit 30 disposed on the second shielding board 24, and one signal return path is provided by the protrusion structure 31 on the fourth shielding board 26. In conclusion, the shielding unit can provide seven signal return paths in total, to effectively improve crosstalk performance of the connector.

In conclusion, this embodiment of this application provides the connector. The shielding boards are disposed around the first signal terminal. Each shielding board may be electrically connected to the peer shielding board of the paired connector by using the contact unit. Therefore, there are relatively sufficient signal return paths. A shielding structure surrounding the signal terminal may be formed, to implement a good shielding effect and optimize crosstalk performance of the connector.

Figure 12:
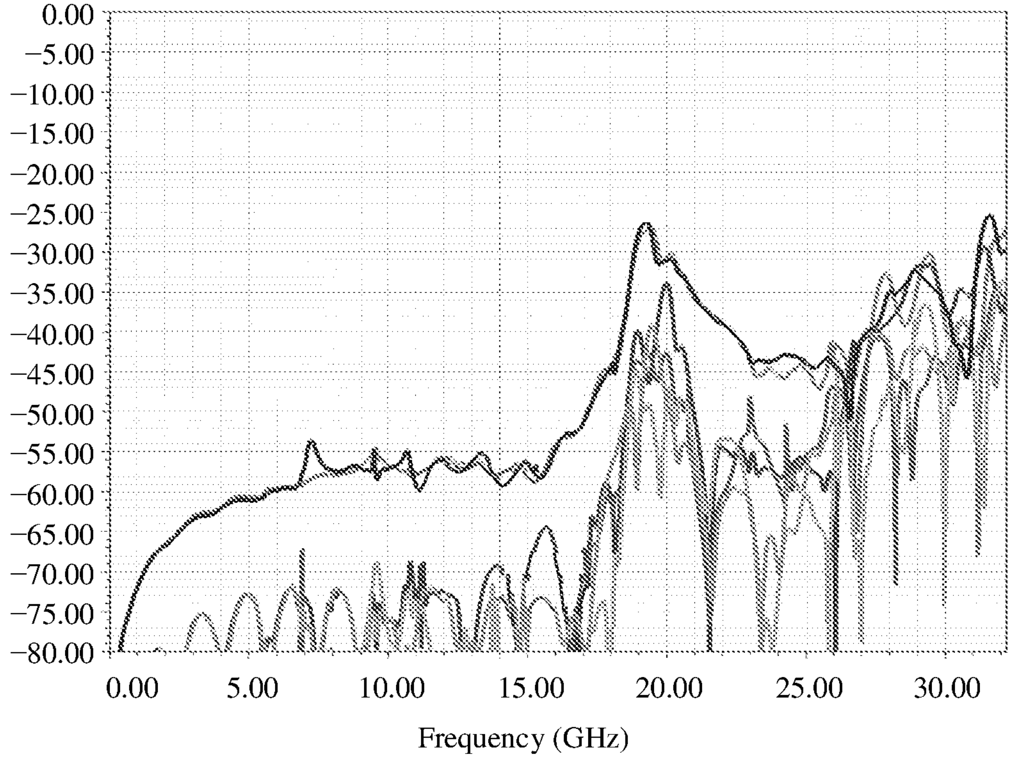
FIG. 12 is a crosstalk curve of a connector according to the conventional technologies.
Figure 13:
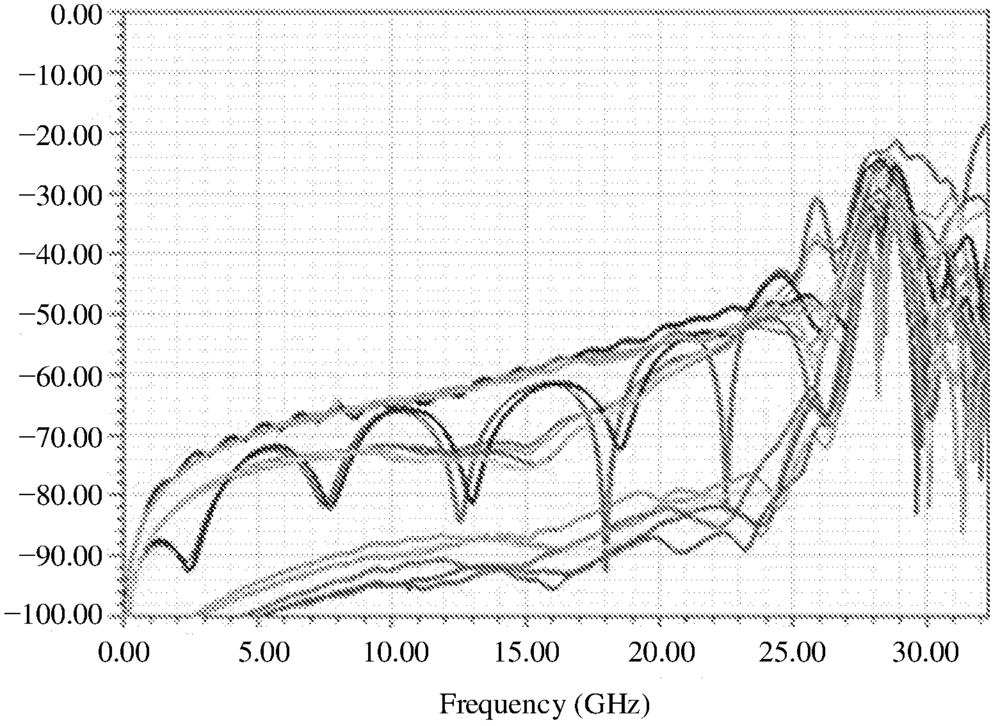
FIG. 13 is a crosstalk curve of a connector according to an embodiment of this application.

FIG. 12 is a crosstalk curve of a connector prepared by using another solution. FIG. 13 is a crosstalk curve of a connector according to an embodiment of this application. It may be learned that, in a shielding structure of the connector prepared by using another solution, near-end crosstalk and far-end crosstalk resonate around 20 GHz. A resonance peak value may reach-23 dB, which seriously affects signal transmission quality of the connector. For the connector provided in this embodiment of this application, sufficient signal return paths are set, relatively even grounding distribution is implemented around mutually paired signal terminals, and no obvious resonance occurs between near-end crosstalk and far-end crosstalk before 25 GHz. Therefore, in this embodiment of this application, a crosstalk resonance frequency of the connector can be increased from 20 GHz to about 25 GHz, to optimize high-frequency crosstalk performance, so that the connector can be used to support data transmission at 56 Gbps and even a higher rate.

Still with reference to FIG. 8, an embodiment of this application further provides a connector assembly. The connector assembly includes the connector in any one of the foregoing embodiments and a paired connector with which mutual pairing and interposing are implemented for the connector. In this embodiment of this application, the connector may be specifically a female connector, and the paired connector may be a male connector.

The paired connector may include a plurality of second terminal modules disposed in an array. The second terminal module may specifically include a second signal terminal 40 and a plurality of peer shielding boards 51. The plurality of peer shielding boards 51 may be disposed around the second signal terminal 40. When the paired connector and the connector are mutually paired and connected, the second signal terminal 40 is specifically configured to electrically connect to the first signal terminal 10, to transmit a differential signal in an electronic device. The peer shielding board 51 may be interposed between two adjacent first terminal modules. Two sides of the peer shielding board 51 may be respectively electrically connected to two shielding boards 21 of two adjacent first terminal modules.

In specific implementation, there may alternatively be three, four, five, or more peer shielding boards 51 in the second terminal module. This is not limited in this application. It may be understood that, to ensure adaptation between the paired connector and the connector and a shielding effect after the mutual pairing, a quantity of peer shielding boards 51 in the second terminal module may be equal to a quantity of shielding boards 21 in the first terminal module.

Figure 9:
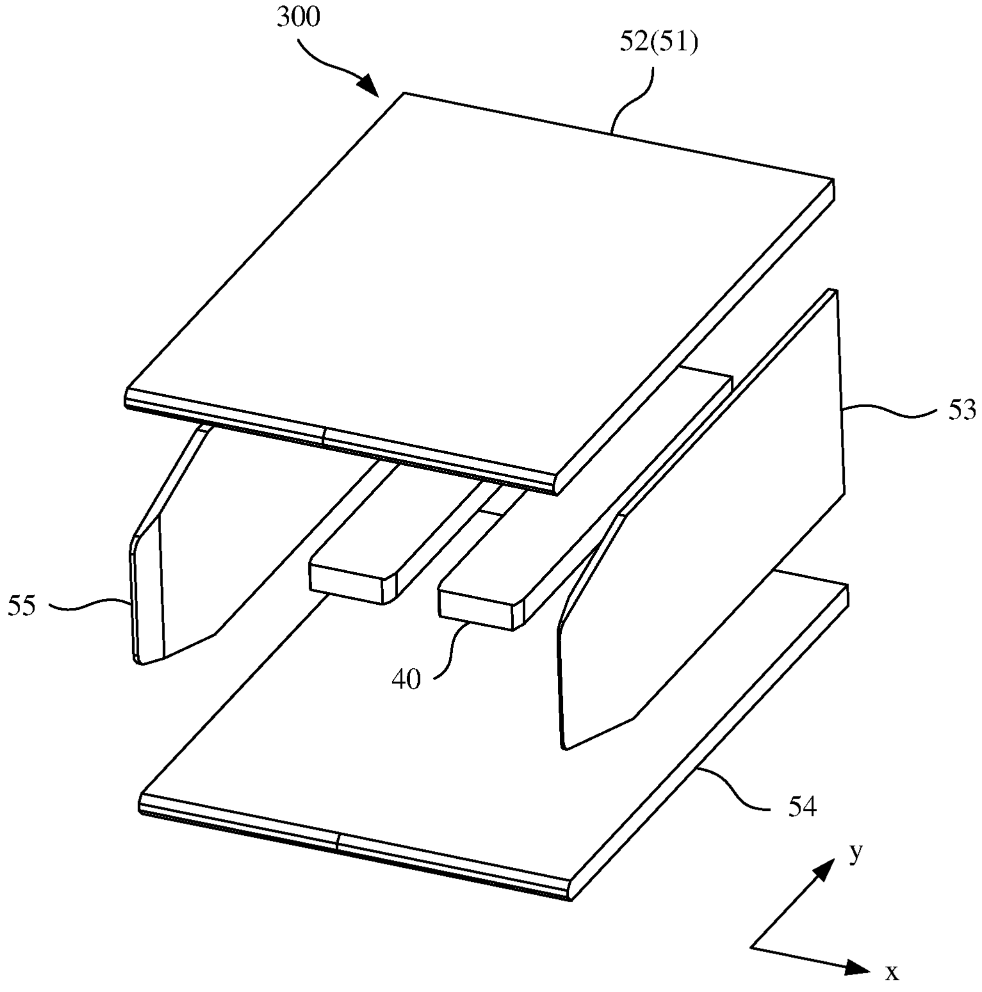
FIG. 9 is a schematic diagram of a structure of a second terminal module according to an embodiment of this application.

Similarly, four peer shielding boards 51 are used as an example. With reference to a schematic diagram of a structure of a second terminal module 300 shown in FIG. 9, the four peer shielding boards 51 may be respectively a fifth shielding board 52, a sixth shielding board 53, a seventh shielding board 54, and an eighth shielding board 55. The fifth shielding board 52 and the seventh shielding board 54 are disposed opposite to each other, and the sixth shielding board 53 and the eighth shielding board 55 are disposed opposite to each other. In the array of the second terminal modules 300, the fifth shielding board 52 and the seventh shielding board 54 may be arranged in a row direction (that is, an x direction) of the array, and the sixth shielding board 53 and the eighth shielding board 55 may be arranged in a column direction (that is, a y direction) of the array. To simplify a structure and a manufacturing process of the connector, in this embodiment of this application, fifth shielding boards 52 of the plurality of second terminal modules 300 disposed in the same row may be connected to each other to form a one-piece shielding board, and similarly, seventh shielding boards 53 of the plurality of second terminal modules 300 disposed in the same row may also be connected to each other to form a one-piece shielding board.

Figure 10:
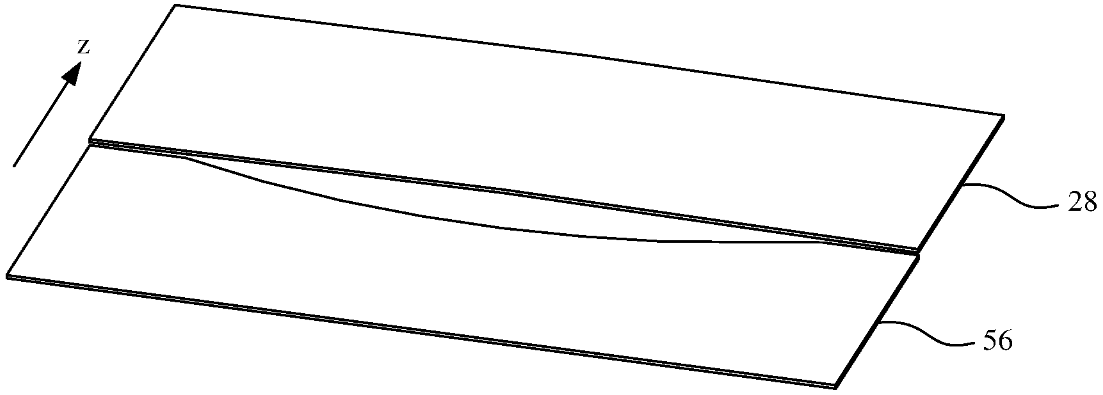
FIG. 10 is a diagram of a status of an interposing connection between a one-piece shielding board and a long female shielding board according to an embodiment of this application.

With reference to FIG. 10, the one-piece shielding board 56 may be specifically interposed between the first shielding board and the third shielding board of the first terminal module. When the first shielding boards or the third shielding boards that are of the plurality of first terminal modules and that are disposed in the same row also form a one-piece structure, for example, a long shielding board shown in FIG. 10, the long shielding board in the connector is referred to as a long female shielding board 28 below for ease of description. Because a one-piece long shielding board cannot be fully straight in an actual processing process, a fine deflection may occur. When the paired connector and the connector are mutually paired, interposing may be not smoothly implemented for long shielding boards on two sides.

Figure 11A:
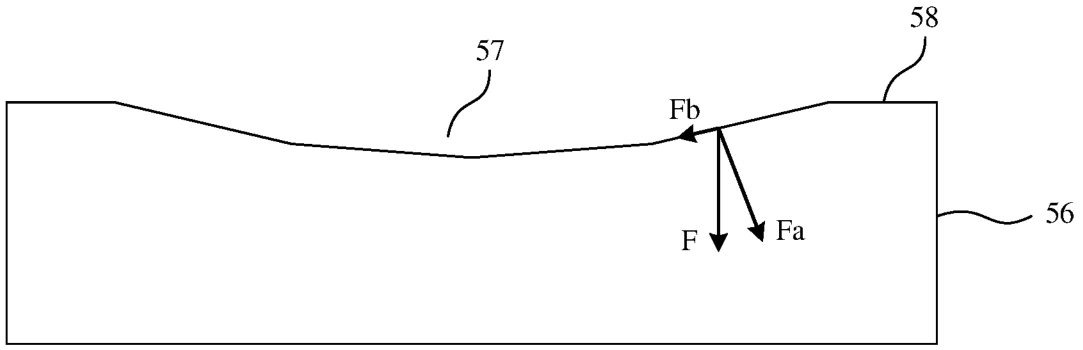
FIG. 11*a* is a diagram of a stress status of a one-piece shielding board according to an embodiment of this application.
Figure 11B:
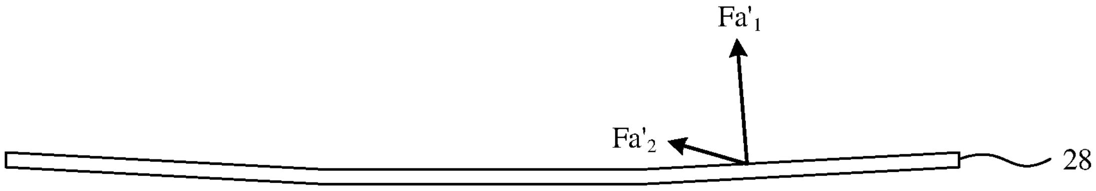
FIG. 11*b* is a diagram of a stress status of a long female shielding board according to an embodiment of this application.

As shown in FIG. 11*a* and FIG. 11*b*, to reduce an occurrence risk of this case, in some embodiments of this application, an interposing direction of the paired connector and the connector is a first direction (that is, a z direction), the one-piece shielding board 56 has an arc notch 57 on the first side surface in the first direction, and flat parts 58 located on two ends of the arc notch 57. In this way, when interposing is implemented between the one-piece shielding board 56 and the long female shielding board 28, a sidewall of the arc notch 57 may be in contact with the female shielding board 28. Because the one-piece shielding board 56 and the female shielding board 28 are not fully parallel to each other, a contact force F is imposed on the sidewall of the arc notch 57 in the interposing process. The contact force F may be resolved into a component force Fa in a normal direction and a component force Fb in a tangential direction. The component force Fa may form a reaction force Fa' (not shown in the figure due to an angle) on the long female shielding board 28. Due to existence of the deflection, Fa' is not in parallel to a plane in which the long female shielding board 28 is located, and may be resolved into component forces $Fa'_1$ and $Fa'_2$. A direction of $Fa'_1$ is a laminating direction after interposing is implemented between the one-piece shielding board 56 and the long female shielding board 28. Therefore, the component force $Fa'_1$ can always point to an opposite direction of the deflection, to provide a function of reducing the deflection in the mutual pairing and interposing, thereby reducing a risk of a bent pin or a crush pin of the long shielding board and improving structural reliability of the connector assembly. In this way, the connector can be successfully connected to the paired connector.

It can be learned that the connector assembly provided in this embodiment of this application can not only implement a relatively good shielding effect through cooperation between the shielding board and the peer shielding board, but also improve a structure of the long shielding board. In this way, a problem of a bent pin easily occurring when connectors on two sides are mutually paired can be resolved, to improve structural reliability of the connector assembly.

An embodiment of this application further provides an electronic device that uses the connector in the foregoing embodiment. The electronic device may be a device such as a communications device, a server, a supercomputer, a router, or a switch in the conventional technologies. The electronic device may include a first circuit board, a second circuit board, and a circuit board assembly in the foregoing embodiments. A connector may be disposed on the first circuit board, and is electrically connected to the first circuit board. A paired connector may be disposed on the second circuit board, and is electrically connected to the second circuit board. In this way, when the connector and the paired connector are paired and connected, a signal may be transmitted between the first circuit board and the second circuit board. Because of relatively good shielding performance of the connector assembly, a crosstalk phenomenon between signals can be improved, and signal transmission performance can be optimized.

In the foregoing solutions, specific types of the first circuit board and the second circuit board are not limited. For example, in some implementations, the first circuit board may be specifically a line card, and the second circuit board may be specifically a network interface card.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A connector, comprising a plurality of first terminal modules arranged in an array, and each first terminal module of the plurality of first terminal modules comprises a shielding unit and a first signal terminal, wherein the shielding unit comprises a plurality of shielding boards sequentially connected to form a shielding cavity, a first surface of a shielding board of the plurality of shielding boards faces away from the shielding cavity and is configured to cooperate with a peer shielding board of a paired connector, a contact unit protruding from the first surface is disposed on the shielding board, and the contact unit is configured to electrically connect to the peer shielding board of the paired connector; and the first signal terminal is located in the shielding cavity.

2. The connector according to claim 1, wherein the contact unit is a rigid contact unit or an elastic contact unit.

3. The connector according to claim 2, wherein the contact unit is a rigid contact unit, and the rigid contact unit is of a protrusion structure.

4. The connector according to claim 2, wherein the contact unit is an elastic contact unit, the elastic contact unit is a first spring arm, and the first spring arm is disposed and inclined in a direction away from the first surface.

5. The connector according to claim 4, wherein a length of the first spring arm is between 0.9 mm and 2.5 mm.

6. The connector according to claim 2, wherein the contact unit is an elastic contact unit, the elastic contact unit comprises two second spring arms, the two second spring arms are respectively disposed and inclined to a direction away from the first surface, and first ends of the two second spring arms are separately connected to the shielding board; and second ends of the two second spring arms intersect with each other.

7. The connector according to claim 1, wherein a quantity of shielding boards in the shielding unit is four.

8. The connector according to claim 7, wherein shielding boards of respective pairs of the four shielding boards are disposed opposite to each other, and in two shielding boards disposed opposite to each other, a contact unit disposed on at least one of the two shielding boards is an elastic contact unit.

9. The connector according to claim 7, wherein the four shielding boards are respectively a first shielding board, a second shielding board, a third shielding board, and a fourth shielding board, the first shielding board and the third shielding board are disposed opposite to each other and arranged in a column direction, and the second shielding board and the fourth shielding board are disposed opposite to each other and arranged in a row direction; and first shielding boards that are of the plurality of first terminal modules and that are disposed in a same row are connected to each other; and third shielding boards that are of the plurality of first terminal modules and that are disposed in the same row are connected to each other.

10. The connector according to claim 1, wherein at least one contact unit is disposed on each shielding board.

11. A connector assembly, comprising:

a connector, which comprises a plurality of first terminal modules arranged in an array, and each first terminal module of the plurality of first terminal modules comprises a shielding unit and a first signal terminal, wherein the shielding unit comprises a plurality of shielding boards sequentially connected to form a shielding cavity, a first surface of a shielding board of the plurality of shielding boards faces away from the shielding cavity and is configured to cooperate with a peer shielding board of a paired connector, a contact unit protruding from the first surface is disposed on the shielding board, and the contact unit is configured to electrically connect to the peer shielding board of the paired connector; and the first signal terminal is located in the shielding cavity; and, a paired connector that is paired with and connected to the connector in an interposing manner, wherein the paired connector comprises a plurality of second terminal modules arranged in an array manner, and each second terminal module of the plurality of second terminal modules comprises a second signal terminal and a plurality of peer shielding boards, wherein the plurality of peer shielding boards are disposed around the second signal terminal, and a quantity of peer shielding boards in the each second terminal module is equal to a quantity of shielding boards in the each first terminal module, and wherein when the paired connector and the connector are mutually paired, the second signal terminal is electrically connected to a corresponding first signal terminal, the peer shielding board is interposed between two adjacent first terminal modules, and two sides of the peer shielding board are respectively electrically connected to shielding boards of the two adjacent first terminal modules.

12. The connector assembly according to claim 11, wherein a quantity of peer shielding boards in the each second terminal module is four.

13. The connector assembly according to claim 12, wherein the four peer shielding boards are respectively a fifth shielding board, a sixth shielding board, a seventh shielding board, and an eighth shielding board, the fifth shielding board and the seventh shielding board are disposed opposite to each other and arranged in a column direction, and the sixth shielding board and the eighth shielding board are disposed opposite to each other and arranged in a row direction; and fifth shielding boards that are of the plurality of second terminal modules and that are disposed in a same row are connected to each other to form a first one-piece shielding board, and seventh shielding boards that are of the plurality of second terminal modules and that are disposed in the same row are connected to each other to form a second one-piece shielding board.

14. The connector assembly according to claim 13, wherein the first one-piece shielding board and the second one-piece shielding board each has a first side surface facing a first direction, and the first side surface comprises flat parts located on two ends and an arc notch disposed between the two flat parts; and the first direction is an interposing direction of the paired connector and the connector.

15. An electronic device, comprising a first circuit board, a second circuit board, and a connector assembly comprising:

a connector, which comprises a plurality of first terminal modules arranged in an array, and each first terminal module of the plurality of first terminal modules comprises a shielding unit and a first signal terminal, wherein the shielding unit comprises a plurality of shielding boards sequentially connected to form a shielding cavity, a first surface of a shielding board and faces away from the shielding cavity and is configured to cooperate with a peer shielding board of a paired connector, a contact unit protruding from the first surface is disposed on the shielding board, and the contact unit is configured to electrically connect to the peer shielding board of the paired connector; and the first signal terminal is located in the shielding cavity; and, the paired connector that is paired with and connected to the connector in an interposing manner, wherein the paired connector comprises a plurality of second terminal modules arranged in an array, and each second terminal module of the plurality of second terminal modules comprise a second signal terminal and a plurality of peer shielding boards, wherein the plurality of peer shielding boards are disposed around the second signal terminal, and a quantity of peer shielding boards in the each second terminal module is equal to a quantity of shielding boards in the each first terminal module, and wherein when the paired connector and the connector are mutually paired, the second signal terminal is electrically connected to a corresponding first signal terminal, the peer shielding board is interposed between two adjacent first terminal modules, and two sides of the peer shielding board are respectively electrically connected to shielding boards of the two adjacent first terminal modules, wherein the connector is disposed on the first circuit board, and is electrically connected to the first circuit board; and a paired connector is disposed on the second circuit board, and is electrically connected to the second circuit board.

16. The electronic device according to claim 15, wherein the first circuit board is a line card, and the second circuit board is a network interface card.

* * * * *